INVENTORS.
THOMAS S. MERTES
BY HARRISON B. RHODES

ATTORNEYS

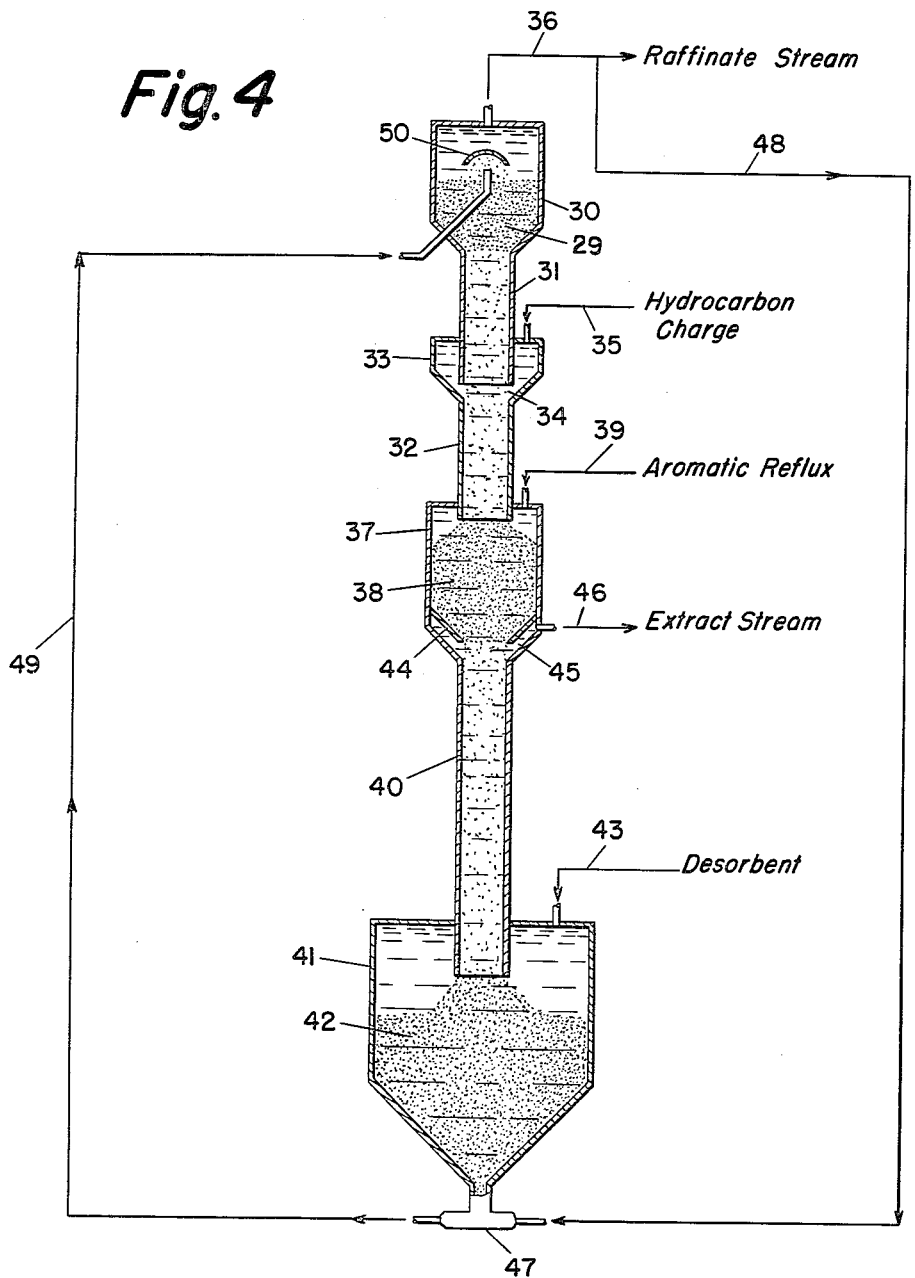

United States Patent Office 2,745,888
Patented May 15, 1956

2,745,888

TREATING OF LIQUIDS WITH GRANULAR SOLIDS

Thomas S. Mertes, Wilmington, Del., and Harrison B. Rhodes, Norwood, Pa., assignors to Sun Oil Company, Philadelphia, Pa., a corporation of New Jersey Application January 21, 1952, Serial No. 267,466

8 Claims. (Cl. 260—674)

This invention relates to the treating of liquids with granular solids and has particular applicability to method and apparatus for countercurrently treating a liquid with a granular solid such as an adsorbent.

There are numerous industrial operations which involve the treatment of a liquid with a solid material in granular form. Examples are the decolorization of oils or waxes with clays, the treatment of various liquids with ion exchange materials, and the separation of liquid organic compounds, such as hydrocarbons, from each other by means of selective adsorbents. The present invention has wide applicability to such types of operations and provides an improved countercurrent procedure for carrying out the treatment. The invention is hereafter described with special reference to the treatment of liquids with selective absorbents.

Countercurrent treatment conducted in the manner of the present invention involves the use of an open column providing a countercurrent treating zone through which the liquid passes upwardly and the adsorbent particles fall downwardly; and further involves the establishment of certain conditions whereby the adsorbent is restrained from falling at its normal rate so that the adsorbent within the treating zone is maintained in more dense form than it normally would have in falling freely through the liquid. Under the conditions maintained the proportion of adsorbent to liquid within the treating zone is greater than that at the "flooding point" of the column as the term is usually understood in the art. Due to the high proportion of adsorbent a reduction in required height of the treating zone or column is effected as compared to a system in which the adsorbent is allowed to fall in a normal manner. The invention is also advantageous in that the feeding of adsorbent to the treating zone at the desired rate is greatly simplified and further in that the adsorbent is introduced uniformly over the entire cross-section of the treating zone.

These and other advantages will be understood from the description which follows, taken in conjunction with the accompanying drawings in which:

Figure 4 is an illustration of a system particularly adapted for separating hydrocarbon mixtures according to chemical type by selective adsorption.

Figure 1:
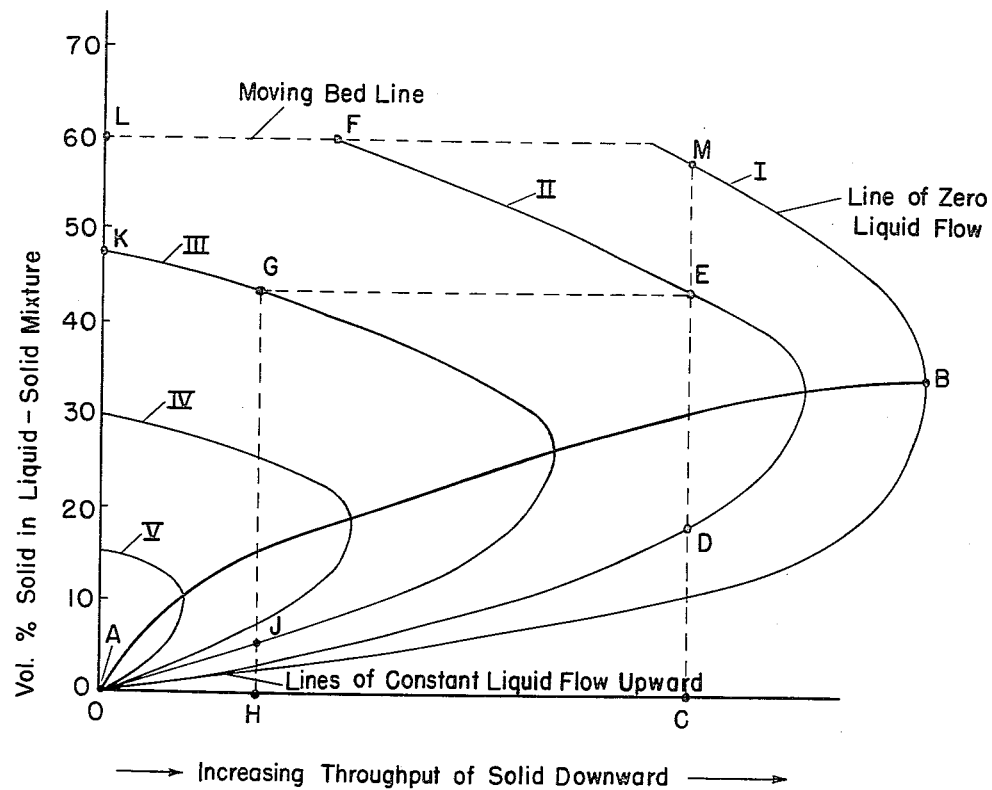
Figure 1 is a diagram illustrating the distinction between the relatively dense falling particle phase utilized in practicing the present invention and the relatively sparse falling particle phase normally obtained in solid-liquid counterflow systems.

Figure 1 presents a correlation for systems in which solid particles move downwardly and liquid upwardly under equilibrium or steady state counterflow conditions. The correlation shows the relationship between the percent solid in the solid-liquid mixture and the amount of solid passed through a unit cross-sectional area of the column per unit time for several liquid flow rates. The percent solid conveniently can be expressed as volume percent, the volume of any pores within the solid particles being included as a part of the solid volume. Constant liquid rates are represented by the curved lines (I, II, III, IV and V) which have a negative slope in the upper part of the chart and a positive slope in the lower part. The outer curved line (I) of the series represents a condition of no net liquid flow through the column, while the lines positioned inwardly represents progressively increasing upflow of liquid.

The heavy line AB of Figure 1 is drawn through the points on the curved lines at which their slopes change from negative to positive, and it divides the chart into upper and lower areas. This line AB represents the maximum solid throughput that can be obtained at any given liquid rate or, conversely, the maximum liquid rate that can be obtained at any given solid throughput under equilibrium counterflow conditions. This line corresponds to the condition generally considered in the art as the "flooding point" of the column.

The upper and lower areas separated by line AB in the chart represent two distinct states or phases for the solid-liquid mixture. The upper area defines a relatively dense state of dispersion which conveniently may be referred to as the N-phase because it occurs in the area where the curved lines have negative slopes. The lower area defines a relatively sparse state, conveniently referred to as the P-phase because of the positive slope of the curved lines. For upward flow of liquid, these areas are bounded by the outer curved line I representing zero net liquid flow.

Within each of the areas referred to above, the adsorbent passing through the column is in a falling state, as distinguished from a moving bed. It will be noted in Figure 1 that the specified upper area is bounded by a dashed line representing a relatively high concentration of solid in the liquid. This line corresponds to a moving bed in which the solid particles essentially are resting upon each other rather than being in a falling state. The position of this line is dependent upon the packing characteristics of the particular adsorbent concerned, such characteristics determining the percent solid which will be present when the particles are in bed form. For purpose of illustration, it has been assumed that Figure 1 represents an adsorbent which has a particle size distribution and particle shape such that, when in moving bed form, it will constitute 60% by volume of the liquid-solid mixture.

An important fact which can be derived from the type of correlation depicted in Figure 1 is that a countercurrent column can be operated with either of two distinct dynamic equilibrium solid-liquid states in each of which the adsorbent is falling through the liquid at the same solid throughput rate although with different particle velocities while also the liquid is flowing at the same liquid throughput rate. These are respectively referred to herein as N-phase and P-phase for the reasons previously stated. A P-phase system can readily be established and maintained without application of special techniques, and this is the type of operation commonly employed for solid-liquid counterflow systems. On the other hand, an N-phase system will not be obtained when usual operating procedures are followed. According to the present invention, the counterflow system is maintained in N-phase so that the advantages of the higher solid content within the liquid can be secured. This is achieved by the application of special operating technique or conditions as more fully described hereinafter.

For a better understanding of Figure 1, assume that a column is to be operated with a liquid flow rate per unit of cross-sectional area corresponding to line II and with a throughput of adsorbent per unit of cross-sectional area corresponding to point C. Under these conditions the percent adsorbent in the solid-liquid mixture could be that corresponding either to point D (about 18%) or to point E (about 43%) depending upon whether the system is maintained in P-phase or in N-phase. If the adsorbent were merely fed into the top and withdrawn from the bottom in the usual manner, the system would inherently assume the P-phase form and the N-phase type of operation would not result. However, it is possible to obtain N-phase operation by applying certain conditions effecting a restraint on the fall of adsorbent particles to cause the concentration to build up to and remain at that amount corresponding to point E. With the flow conditions here specified it would be impossible for the column to operate with the adsorbent in the form of a moving bed. However, for the same liquid rate, a moving bed could be obtained by decreasing the solid throughput until it reached a value equivalent to point F on the moving bed line.

Assuming now that the liquid flow rate is changed to a higher value corresponding to line III, it would be impossible to maintain the adsorbent rate indicated by point C. The amount of adsorbent which would pass through the column would have to decrease at least until the ordinate line corresponding to the adsorbent throughput intersected line III. Further assuming that at the higher liquid rate it is desired to maintain the same per cent adsorbent in liquid as at point E, the throughput of adsorbent would have to be decreased, as indicated by the line GE, until it reached a value equivalent to point H. To maintain the relatively dense state corresponding to G, again it would be necessary to employ proper operating conditions providing a restraint on the fall of particles to prevent the system from changing to the relatively sparse or P-phase state indicated by point J. It should be noted further that for the higher liquid rate corresponding to line III it is impossible to obtain a moving adsorbent bed regardless of how much the adsorbent throughput is decreased.

By way of further explanation of Fig. 1, a fluidized bed through which liquid is flowing upwardly but in which there is no net flow of adsorbent in either direction is indicated by a point on the ordinate at an abscissa value of zero, for example, point K. A fixed adsorbent bed is represented also by a point on this ordinate at a higher percent solid value the amount of which depends upon the packing characteristics of the adsorbent, for example, by point L.

The procedure according to the invention, whereby the concentration of adsorbent falling through the liquid is brought up to and maintained at an amount such that the system is in N-phase, involves certain features of operation. One is that a relatively dense mass of adsorbent is maintained within the column below the level at which the liquid is introduced. This mass functions to exert throughout the column a restraint which prevents the adsorbent particles from falling at the normal rate for freely falling particles, thus allowing a relatively high concentration of solids to be established and maintained. This is believed to be due to interference in the motion of particles which originates adjacent the dense mass and extends upwardly throughout the column.

Another feature comprises the use of an expanded section of column immediately above the countercurrent treating section. This section serves as a reservoir for adsorbent from which the particles are free to fall directly into the countercurrent treating section without passing through any intermediate valve or other constriction. In other words, the treating zone is positioned immediately beneath the expanded section which acts as a reservoir and there is no constriction therebetween. As a general rule, the cross-sectional area of the reservoir section should be at least 2 times that of the countercurrent treating section. Due to the larger diameter of the reservoir section, the adsorbent which is fed into it inherently assumes a dense form, being either a moving bed or a very dense N-phase, preferably the latter. This results from the fact that the rates of adsorbent and liquid throughput per unit cross-sectional area are lower in this section than in the smaller diameter portion of the column which serves as the treating zone. The restraining influence caused by the dense mass of adsorbent below the treating zone is exerted up to the reservoir section, as a consequence of which the adsorbent falls from the reservoir only at the same rate that adsorbent is removed from the dense mass below. The result of this is that the rate of adsorbent throughput can be regulated simply by controlling the withdrawal of adsorbent from the bottom, and the feeding of adsorbent from the reservoir to the treating zone at desired rate will automatically follow.

A further feature of the procedure for practicing the invention comprises maintaining liquid within the reservoir section so that the supply of adsorbent therein, or at least the lower portion of it, is kept immersed in the liquid. This is important in that it deaerates or removes gas from the adsorbent before the latter falls into the treating zone. It has been found that such removal of gas is important, as otherwise the desired N-phase type of system cannot properly be secured uniformly throughout the treating zone due to interference from gas bubbles.

Figure 2:
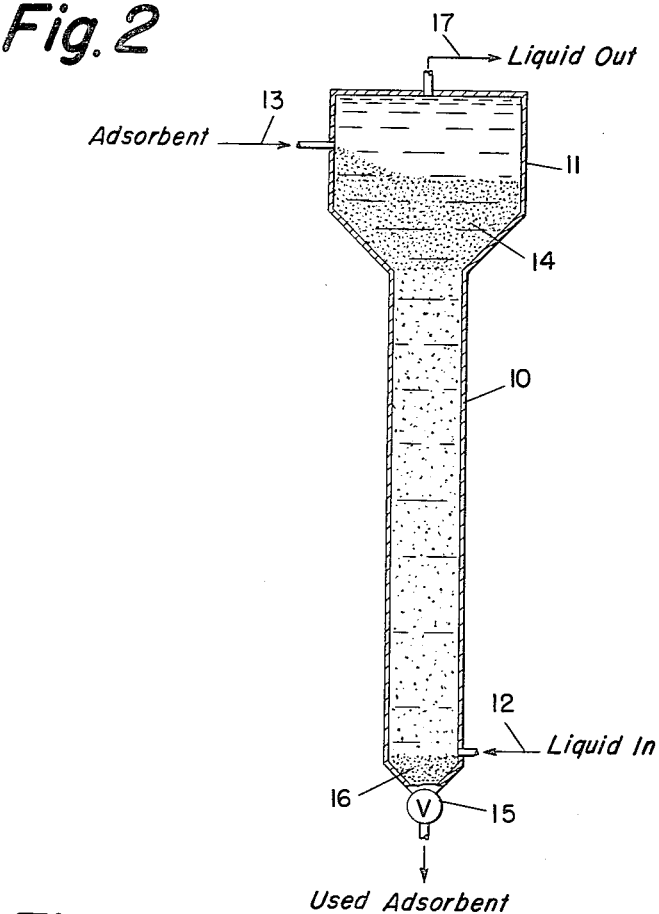
Figure 2 is an elevational view of a simplified system for practicing the invention.

Reference is now made to Figure 2 which is a simplified illustration of a system operating according to the invention. An open column is provided which has a treating section 10 of relatively small diameter and an expanded section 11 which serves as an adsorbent reservoir. The expanded section 11 desirably is tapered to connect with the treating section 10, the angle of taper with the horizontal preferably being greater than the angle of repose of the adsorbent. The term "open column" as used herein refers to a column which contains substantially no baffles, packing or other flow obstruction throughout the treating zone. It is important that the column be open in this sense in order to obtain a uniform N-phase system and thus secure most efficient utilization of the column capacity.

Liquid is introduced into a lower part of the column through line 12 and flows upwardly countercurrent to falling adsorbent in treating section 10 and then into expanded section 11, from which it is withdrawn at the top via line 17. Adsorbent is added intermittently or continuously to the reservoir through line 13 to maintain therein a supply of adsorbent in relatively dense form. The mass of adsorbent, indicated at 14, will be either in the form of a moving bed or as a very dense N-phase depending upon the throughput rates of adsorbent and liquid per unit cross-sectional area of the expanded section. Preferably the mass 14 is maintained as a very dense N-phase with a solid content just below that of a moving bed such as indicated by the dashed line in Figure 1. At the bottom of the column a mass of adsorbent, indicated by numeral 16, is maintained below the liquid feed line 12. Adsorbent is withdrawn from this mass through valve 15 at a rate corresponding to the desired rate of throughput of adsorbent. By operating in this manner with an open column a steady state condition will be reached at which a uniform N-phase type of system will be present throughout the treating section 10. Adsorbent will fall from the mass 14 into treating section 10 at essentially the same rate that adsorbent is withdrawn through valve 15 at the bottom, and the dispersion within the treating section will have a constant solid content. This content will be less than that in the dense masses of adsorbent at 14 and 16 but will be higher than for a P-phase system, as indicated by Figure 1.

For starting operation of the column in Figure 2 a simple procedure is to fill the system with liquid first and then introduce a sufficient amount of adsorbent, as through line 13, to form a bed in approximately the lower half of section 10. Flow of the liquid is then started through line 12 at the desired rate. This will cause the bed of adsorbent to expand upwardly in the column. Adsorbent is then introduced into the reservoir through line 13 either intermittently or continuously to provide a supply of adsorbent in relatively dense form as indicated at 14. Withdrawal of adsorbent from the bottom of the column is then begun at the desired rate by suitable regulation of valve 15, following which the system will come to steady state flow conditions with an N-phase system prevailing throughout the treating zone.

It will be noted that with the system shown in Figure 2 all of the liquid which flows upwardly through treating system 10 passes through the mass of adsorbent in the reservoir and is withdrawn at the top. A modification, illustrated in Figure 3, provides means for withdrawing the liquid immediately below the reservoir so that it does not flow through the adsorbent supply mass.

Figure 3:
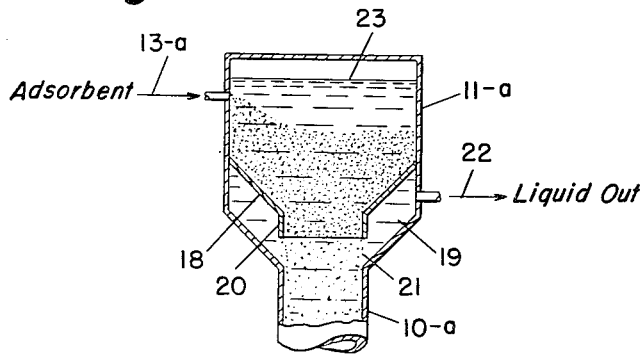
Figure 3 is an illustrative modification of the upper portion of the system of Figure 2.

In Figure 3 an inverted frustoconical baffle 18 is provided within expanded section 11-a so as to form a liquid removal zone, indicated by numeral 19, in the lower part of the expanded section. Attached to the frustoconical baffle is a downwardly extending lip 20 which terminates above the top of treating section 10-a so as to provide an opening 21 for outward flow of liquid. The height of this opening should be at least one-quarter of the diameter of the column in order to effect proper disengagement of the liquid from the solid. Thus the liquid which flows up from section 10 separates from the adsorbent by passing outwardly through opening 21 and is withdrawn through line 22. In this modification adsorbent is fed through line 13-a in the same manner as described in connection with Figure 2 in amount to maintain a dense mass of adsorbent within the reservoir. It is important, however, when operating according to this modification to maintain within supply zone 11-a a liquid level, such as indicated by numeral 23, sufficient to immerse at least part of the mass of adsorbent in the liquid. This serves to deaerate the adsorbent before it falls into the treating zone 10-a and thus eliminates gas which otherwise would interfere with obtaining the desired uniform N-phase system.

Figure 4 illustrates an arrangement of apparatus which is particularly adapted for the separation of liquid organic compounds from each other by selective adsorption. In the description which follows the charge material will be considered to be a mixture of saturate and aromatic hydrocarbons which is to be separated into aromatic and saturate products of high purity. As a specific example the charge may be a reformate fraction containing benzene and toluene in admixture with saturate hydrocarbons. The adsorbent will be referred to as silica gel, since this is an especially effective material for selectively adsorbing aromatics from saturates.

The operation of the system illustrated in Figure 4 involves the continuous circulation of silica gel through an open column which operates in a manner to adsorb and then desorb the aromatic component. The column is provided at the top with an expanded section 30 which functions as a reservoir for silica gel which is maintained therein as a dense mass 29 immersed in liquid. Immediately beneath expanded section 30 the column has a section of smaller diameter which serves to adsorb and enrich the aromatic components. This section is composed of an upper part 31 and a lower part 32. The upper part 31 terminates within an expanded portion 33 to provide an opening, indicated at 34, for inflow of charge which is fed into the column from line 35. The charge, after passing through opening 34, flows upwardly through the upper portion 31 countercurrent to silica gel which is maintained therein in an N-phase state, thus selectively adsorbing the aromatic component of the charge. The saturate hydrocarbons continue upwardly from upper portion 31 through reservoir 30 from which they are then withdrawn via line 36 as a raffinate stream which contains, in addition to the saturates, desorbent as hereinafter specified.

The column portion 32 immediately beneath the expanded section 33 constitutes an enriching zone wherein the aromatic component is increased in purity by utilizing aromatic reflux. This portion of the column terminates within another expanded section 37 which, due to its larger diameter, will contain a relatively dense mass of silica gel as indicated at 38. This mass may be either in the form of a moving bed or a very dense N-phase, depending upon the rate of silica gel throughput per unit cross-sectional area. A portion of the aromatic product from the process is refluxed through line 39 to the upper part of expanded section 37 and flows into the bottom of column portion 32 to effect the desired enrichment of the aromatic component.

Beneath the expanded section 37 the column has a lower section 40 of smaller diameter which functions as a desorption zone. Section 40 terminates within a large reservoir 41 which contains a dense mass of the silica gel as indicated at 42. To the upper part of reservoir 41 a suitable liquid desorbent is introduced through line 43. The introduced desorbent flows into the bottom of section 40 and upwardly therein countercurrent to silica gel which is present as an N-phase system. The expanded section 37 at the top of the desorption zone is provided with an inverted frustoconical baffle 44 positioned to provide a space, indicated at 45, in which the mixture of desorbent and desorbed aromatic component is collected separately from the silica gel. This mixture, constituting the extract stream, is withdrawn through line 46 and may be sent to a distillation zone (not shown) for recovering the desorbent and obtaining aromatic product of high purity.

Beneath the large reservoir 41 an eductor 47 is provided for circulation of the silica gel back to the top of the column. For operating eductor 47 a portion of the raffinate stream from the top of the column suitably may be employed, this portion being by-passed from line 36 through line 48 to eductor 47. By suitable regulation of the flow of this material to the eductor silica gel can be withdrawn from reservoir 41 at the desired rate. The mixture of silica gel and transporting fluid passes from eductor 47 through line 49 into expanded section 30 adjacent the top of the column for immediate re-use of the adsorbent. A baffle 50 may be provided in expanded section 30 to aid in disengaging the silica gel from the liquid stream, so that the introduced silica gel will rapidly settle onto and become a part of the dense mass shown at 29.

By operating in the manner described N-phase systems will automatically be maintained within the relatively narrow portions of the column indicated by numerals 31, 32 and 40, while dense masses of the silica gel will be present in the expanded portions indicated by numerals 30, 37 and 41. The rate of throughput of silica gel through the column is controlled simply by regulating the rate of withdrawal by means of eductor 47 at the bottom. By maintaining a mass of adsorbent in reservoir 41 immediately adjacent the bottom of desorption section 40, a restraining effect results which prevents the silica gel throughout the column from falling at the normal rate at which it would travel if no such restraining influence were applied. Consequently, adsorbent particles will fall from the dense masses within expanded sections 30 and 37 into the narrower portions of the column immediately thereunder at essentially the same rate that adsorbent is withdrawn from the bottom.

Suitable desorbents for displacing aromatics from silica gel are known and can readily be selected for practicing the described process. Generally it is advantageous to employ a hydrocarbon liquid which boils outside of the boiling range of the charge stock so that the desorbent can be separated from the products by distillation. A particularly suitable desorbent is an aromatic hydrocarbon liquid which has a boiling range different from that of the aromatics in the charge. For example, if the charge is a reformate containing benzene and toluene, xylene would be a particularly efficient desorbent. Saturate hydrocarbon desorbents can also be used but in such case a larger amount of desorbent would be required due to the fact that saturates have lower adsorbabilities than the aromatic hydrocarbons.

It will be noted that with the system shown in Figure 4 a portion of the desorbent introduced into reservoir 41 will fill the interstices of the adsorbent mass 42 and consequently will be withdrawn along with the adsorbent through jet 47 and will then enter the upper expanded section 30. This will not adversely affect the operation, since the silica gel in any event will contain desorbent in adsorbed phase. This adsorbed portion of desorbent will be removed from the silica gel by the charge hydrocarbons which flow countercurrent thereto in column portion 31. The thus displaced desorbent, together with the non-adsorbed desorbent which flowed out of reservoir 41 with the silica gel, will pass from the top of the column through line 36 in admixture with the saturate components from the charge. The portion of resulting raffinate stream which is not by-passed through line 48 may be sent to a distillation zone (not shown) for separating the desorbent from the saturate hydrocarbon product.

Figure 5:
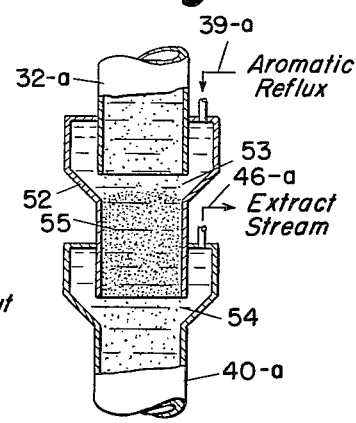
Figure 5 is a modification of the middle portion of the system shown in Figure 4.

Figure 5 illustrates a modified arrangement of apparatus which may be substituted for the middle portion of the column shown in Figure 4. The modification provides for maintaining between the enriching and desorption zones of the column a relatively dense adsorbent mass which has approximately the same diameter as the enriching and desorption zones, instead of the expanded mass 38 shown in Figure 4. According to Figure 5, the column portion 32–a which serves as enriching zone and the desorption section 40–a are joined by means of an intermediate section 52 of which only the upper part is expanded. Portion 32–a terminates within the expanded part so as to provide an opening 53 through which aromatic reflux, introduced by means of line 39–a, can enter the column for upward flow therein. The lower non-expanded part of section 52 terminates within an upper expanded part of desorption section 40–a to provide an opening 54 for disengagement of the extract stream from the falling adsorbent. The extract stream after such disengagement is withdrawn through line 46–a. With this arrangement a dense adsorbent mass 55 can be maintained within the non-expanded part of section 52, and such mass will function to feed adsorbent automatically to the desorption section 40–a at the rate at which adsorbent is withdrawn from the bottom of the column. That such mass can be maintained in a non-expanded part of the column may be seen by reference to the diagram shown in Figure 1, taking into account the circumstance that the introduction and withdrawal of the liquid streams above and below the adsorbent mass is regulated so that little or no net flow of liquid occurs through the non-expanded part of section 52.

With counterflow systems of the type herein described, it is preferable to maintain the relatively dense mass or masses, from which adsorbent is fed to the counterflow zone or zones therebeneath, in the form of a very dense N-phase such as would be represented in Figure 1 by points just beneath the moving bed line. It is also desirable to employ a high solid throughput rate so as to obtain best utilization of the column capacity; but in such case it may not be possible when using the modified arrangement shown in Figure 5 to maintain the mass in as dense form as desired. For example, if the adsorbent mass at the middle portion of the column has the same diameter as the enriching and desorption sections and there is no net liquid flow, reference to Figure 1 will show that, assuming a solid throughput rate equivalent to point C, the maximum density or solid content that can be obtained for the mass would be represented by point M. If this is below the desired density, then it would be advantageous to employ a column having an expanded middle portion as illustrated in Figure 4. The choice of the diameters for the various portions of the column will thus depend upon the particular solid and liquid rates to be maintained and the desired densities of the phases, and the selection should be made with reference to a diagram of the type illustrated by Figure 1.

The foregoing disclosure is merely illustrative of apparatus and procedure for practicing the invention and it will be apparent that numerous modifications may be made without departing from the scope of the invention. It will be understood, for example, that in the arrangement shown in Figure 4 the portions of the column indicated by numerals 31, 32 and 40 need not have the same diameters and may well be designed with somewhat different diameters depending upon the various liquid flow rates. Also, in the event that it is desired to countercurrently contact the solid with additional liquids during its circulation through the system, one or more additional column sections may be included with provisions for maintaining a dense adsorbent mass between each two adjacent sections and for introducing and removing the several liquid streams at the desired levels.

We claim:

1. Process for countercurrently contacting a liquid with a granular solid which comprises: feeding a stream of the liquid into a vertical elongated open column having an upper expanded section constituting a reservoir for granular solid and a lower section of smaller diameter constituting a countercurrent contacting zone, the liquid being fed into a lower part of said section of smaller diameter, flowing liquid upwardly through said section of smaller diameter, maintaining within said reservoir a supply of granular solid in dense form immersed in liquid, permitting said solid to fall directly from said reservoir into said section of smaller diameter and downwardly countercurrent to said liquid, and withdrawing solid from the bottom at a rate such that a mass of solid in dense form is maintained at the lower end of said section of smaller diameter immediately adjacent the level at which liquid enters therein, and the solid falling countercurrent to the liquid is restrained to the extent that an N-phase system, in which the falling solid, while being in less dense form than that within said reservoir, is in more dense form than freely falling solid, is maintained essentially throughout said contacting zone.

2. Process according to claim 1 wherein the liquid which flows upwardly through said contacting zone is permitted to flow through said dense mass in the reservoir.

3. Process according to claim 1 wherein liquid which flows upwardly through said contacting zone is withdrawn from the column intermediate the treating zone and the reservoir.

4. Process according to claim 1 wherein the liquid fed to the column is a mixture of aromatic and saturate hydrocarbons and the granular solid is silica gel.

5. Process according to claim 1 wherein the liquid fed to the column is a desorbent and the supply of solid maintained within said reservoir is silica gel carrying adsorbed aromatic hydrocarbon.

6. Process for separating a charge mixture of aromatic and saturate hydrocarbons by means of a granular selective adsorbent which comprises: feeding a liquid stream of the charge into a vertical elongated open column having, from top toward bottom, an upper expanded section constituting a first adsorbent reservoir, an upper section of smaller diameter constituting a first countercurrent treating zone, a lower expanded section constituting a second adsorbent reservoir and a lower section of smaller diameter constituting a second countercurrent treating zone, said charge being fed into said first countercurrent treating zone at an intermediate level; flowing charge upwardly through said first treating zone; feeding aromatic reflux into said second adsorbent reservoir and flowing the same upwardly into said first treating zone; feeding a liquid stream of desorbing agent into a lower part of said second treating zone and flowing the same upwardly therethrough; maintaining within said first adsorbent reservoir a supply of adsorbent in dense form immersed in liquid; permitting adsorbent to fall directly from said first adsorbent reservoir into said first treating zone and downwardly into said second reservoir, thereby selectively adsorbing and enriching the aromatic component of the charge; collecting adsorbent in said second reservoir as a dense mass; permitting adsorbent to fall directly from the dense mass in said second reservoir into said second treating zone and downwardly countercurrent to desorbing agent, thereby displacing the adsorbed aromatic; withdrawing adsorbent from the bottom at a rate such that a mass of adsorbent in the dense form is maintained at the lower end of said second countercurrent treating zone immediately adjacent the level at which desorbing agent enters therein, and the adsorbent falling in each of said countercurrent treating zones is restrained to the extent that an N-phase system, in which the falling adsorbent, while being in less dense form than that within each of said reservoirs, is in more dense form than freely falling adsorbent, is maintained essentially throughout each of said treating zones; withdrawing from above said first treating zone a raffinate stream rich in charge saturate; and withdrawing adjacent the top of said second treating zone an extract stream comprising charge aromatic and desorbing agent.

7. Process according to claim 6 wherein the adsorbent is silica gel.

8. Apparatus for countercurrently contacting a granular solid successively with two different liquids without substantial intermixing the liquids which comprises: an open column having, from top toward bottom, an upper expanded section constituting a first reservoir for granular solid and having an imperforate inverted frustoconical bottom member, an upper section of smaller diameter beneath said bottom member and constituting a first countercurrent contacting zone, an intermediate expanded section constituting a second reservoir for granular solid and having an imperforate inverted frustoconical bottom member, and a lower section of smaller diameter beneath the bottom member of said intermediate expanded section and constituting a second countercurrent contacting zone; means for maintaining a dense mass of granular solid adjacent the bottom of said second contacting zone; means for introducing a first liquid into a lower part of said first contacting zone for upward flow therein; means for withdrawing liquid from above said first contacting zone; means for introducing a second liquid into a lower part of said second contacting zone for upward flow therein; means for withdrawing liquid adjacent and beneath the lower part of said second reservoir; means for introducing granular solid to said first reservoir; and separate means for withdrawing granular solid from said dense mass maintained adjacent the bottom of the second contacting zone.

References Cited in the file of this patent
UNITED STATES PATENTS

| | | |
|---|---|---|
| 1,671,864 | Higgins | May 29, 1928 |
| 2,073,388 | Elliott | Mar. 9, 1937 |
| 2,528,099 | Wilcox et al. | Oct. 31, 1950 |
| 2,552,435 | Knox et al. | May 8, 1951 |
| 2,572,848 | Fitch | Oct. 30, 1951 |
| 2,582,415 | Claussen | Jan. 15, 1952 |
| 2,585,490 | Olsen | Feb. 12, 1952 |
| 2,608,565 | Bonotto | Aug. 26, 1952 |
| 2,632,720 | Perry | Mar. 24, 1953 |
| 2,701,786 | Evans et al. | Feb. 8, 1955 |